United States Patent
Gao et al.

(10) Patent No.: US 6,801,703 B2
(45) Date of Patent: Oct. 5, 2004

(54) FREESTANDING ATHERMAL POLYMER OPTICAL WAVEGUIDE

(75) Inventors: Renyuan Gao, Downingtown, PA (US); Kazuya Takayama, Iwaki (JP)

(73) Assignee: Photon-X, LLC, Malvern, PA (US)

( * ) Notice: Subject to any disclaimer, the term of this patent is extended or adjusted under 35 U.S.C. 154(b) by 0 days.

(21) Appl. No.: 09/924,982

(22) Filed: Aug. 8, 2001

(65) Prior Publication Data

US 2003/0031446 A1 Feb. 13, 2003

(51) Int. Cl.[7] .............................................. G02B 6/10
(52) U.S. Cl. ...................................................... 385/130
(58) Field of Search ............................ 385/42, 31, 129, 385/130, 131, 132, 14, 15, 16, 39, 51

(56) References Cited

U.S. PATENT DOCUMENTS

| | | | |
|---|---|---|---|
| 4,838,634 A | | 6/1989 | Bennion et al. |
| 5,091,986 A | * | 2/1992 | Arii et al. ...................... 385/48 |
| 5,130,512 A | * | 7/1992 | Coyle et al. ........... 219/121.68 |
| 5,143,577 A | | 9/1992 | Haas et al. |
| 5,170,461 A | | 12/1992 | Yoon et al. |
| 5,263,111 A | | 11/1993 | Nurse et al. |
| 5,500,913 A | * | 3/1996 | Allen et al. .................... 385/48 |
| 5,533,156 A | | 7/1996 | Maxwell et al. |
| 5,673,345 A | * | 9/1997 | Saito et al. .................... 385/49 |
| 5,838,853 A | * | 11/1998 | Jinnai et al. ................... 385/50 |
| 6,097,871 A | | 8/2000 | De Dobbelaere et al. |
| 6,229,949 B1 | | 5/2001 | Ido et al. |

OTHER PUBLICATIONS

M. Hikita, S. Tomaru, K. Enbutsu, N. Ooba, R. Yoshimura, M. Usui, T. Yoshida, S. Imamura, Polymeric Optical Waveguide Films for Short–Distance Optical Interconnects, IEEE Journal of Selected Topics in Quantum Electronics, Sep./Oct. 1999, pp 1237–1242, vol. 5, No. 5.

* cited by examiner

Primary Examiner—Euncha Cherry
(74) Attorney, Agent, or Firm—Joseph E. Maenner; Monte & McGraw, P.C.

(57) ABSTRACT

An optical waveguide is disclosed. The waveguide includes a first cladding layer having a first exposed surface portion and a second surface portion generally opposing the first exposed surface portion, and a core disposed on a portion of the second surface portion. The core has a first end and a second end. The waveguide also includes a second cladding layer having a first exposed surface portion and a second surface portion generally opposing the first exposed surface portion. The second surface portion of the second cladding layer is disposed on the core and a remaining portion of the second surface portion of the first cladding layer. An optical waveguide assembly incorporating the optical waveguide and a method of manufacturing the waveguide are also disclosed.

10 Claims, 7 Drawing Sheets

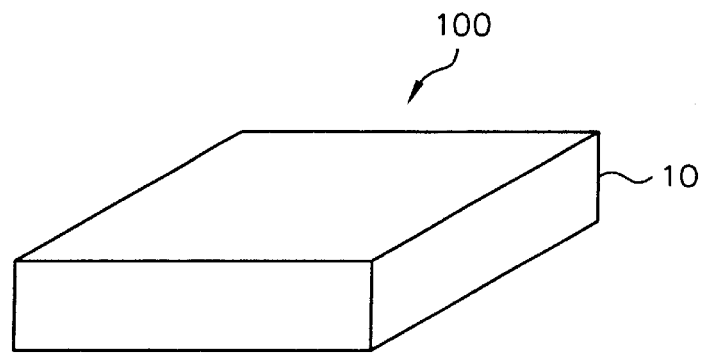
_Fig-1A_
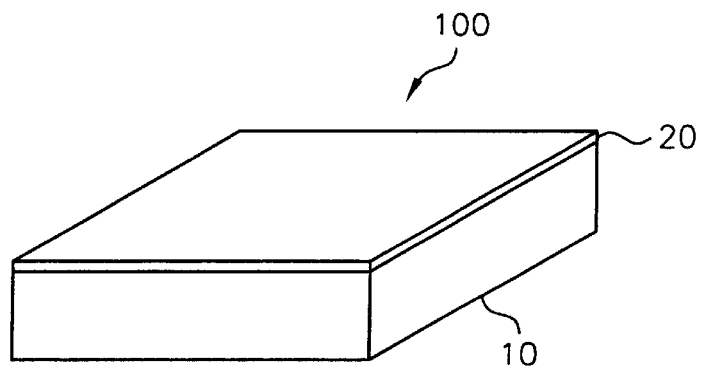
_Fig-1B_
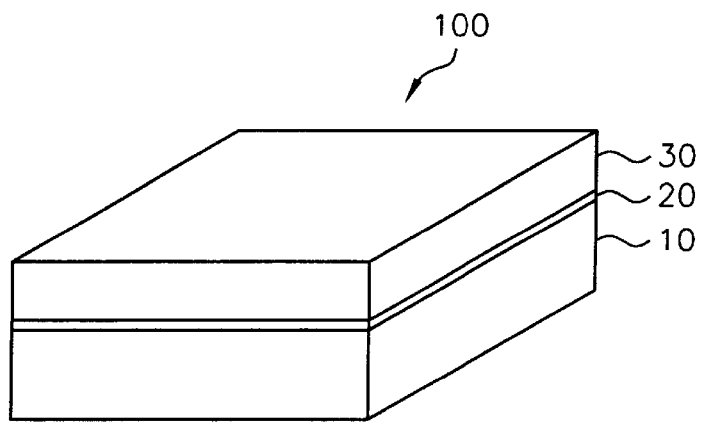
_Fig-1C_

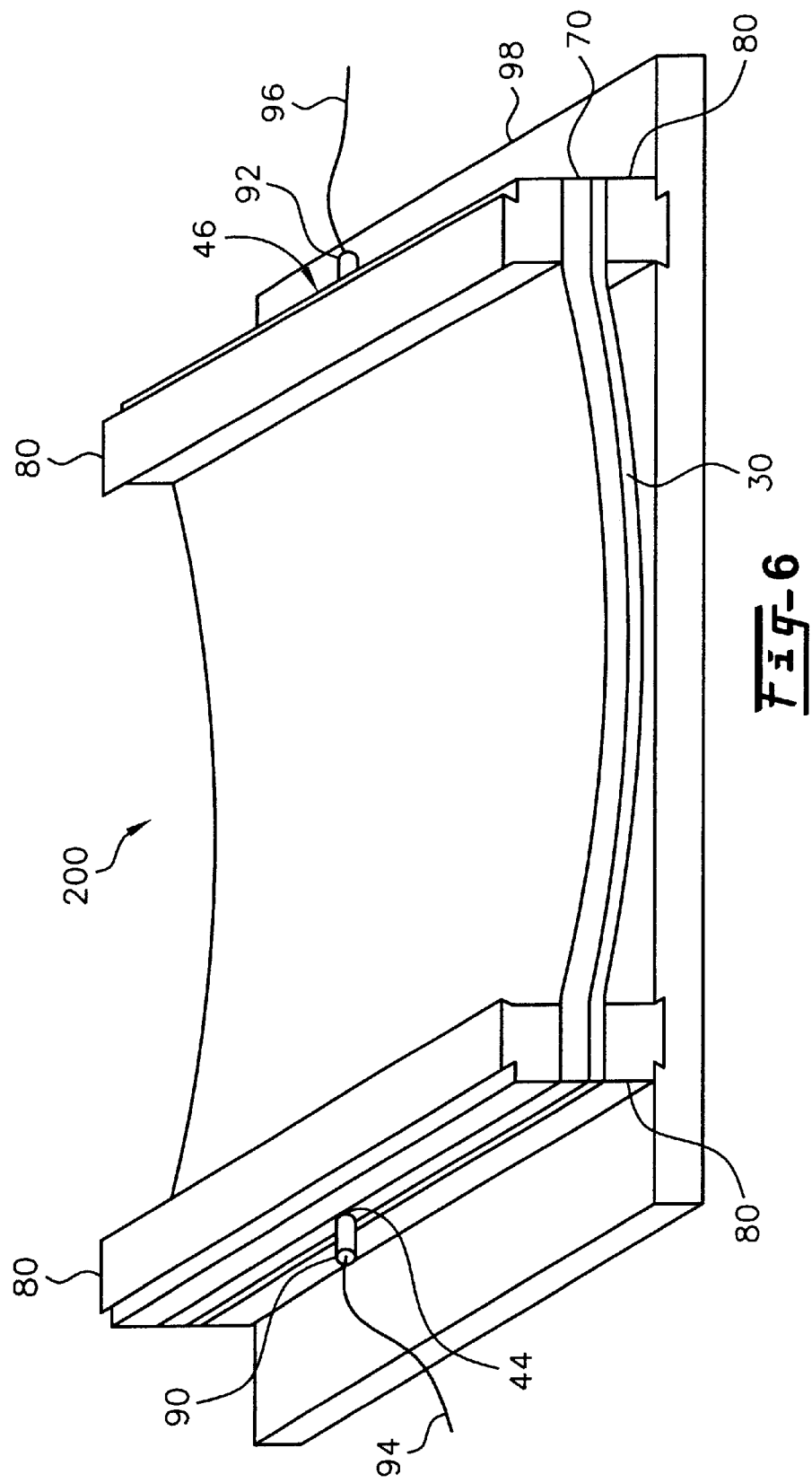

FREESTANDING ATHERMAL POLYMER OPTICAL WAVEGUIDE

FIELD OF THE INVENTION

The present invention relates to polymer optical waveguides.

BACKGROUND OF THE INVENTION

Optical waveguides can be formed in polymers by using a core polymer and a cladding polymer with the core polymer refractive index being slightly higher than that of the cladding polymer (typically 0.3–1%) in the near infrared region of the optical telecommunication wavelength window. In order to form useful optical waveguide devices such as integrated splitters, couplers, arrayed waveguide gratings, and optical waveguide amplifiers, it is essential to have low loss optical waveguides with minimal temperature dependencies. Temperature variations affect several waveguide properties, such as birefringence, refractive indices of the core and the cladding, waveguide loss, etc, largely through a coefficient of thermal expansion (CTE) mismatch between the waveguide layer and the substrate.

A general approach of making polymer optical waveguides is to put an undercladding polymer film layer on a substrate and then a polymer core film layer on top of the undercladding layer. The polymer core layer film subsequently undergoes lithographic and etching processes from which a rectangular cross-section channel is formed. An overcladding polymer film layer is then put on top of the waveguide core and the undercladding. Polymers with CH bonds typically have high absorption in the infrared region where the optical communication signals reside. This high absorption causes optical communication signal loss. To reduce such loss, CF bonds are used to substitute the CH bonds in the waveguide core and cladding polymers. Perfluorinated polymers have no CH bonds, resulting in extremely low absorption loss around the 1.5 μm and 1.3 cm infrared communication wavelengths.

It has been found that, during the processes of forming the undercladding, core and overcladding layers, such as spin coating and subsequent drying of the solvents, temperature changes usually occur around the polymer waveguide layers. Such temperature variation causes polymer shrinkage or expansion in accordance with the CTE of the polymer materials. In the meantime, the waveguide substrate undergoes similar processes as temperature changes. As a silicon wafer is the usual substrate platform for polymer waveguides, the mismatch of CTE between the silicon wafer (CTE of approximately 4 ppm per degree Celsius) and the polymer waveguide cladding and core (CTE of typically between 50 and 100 ppm per degree Celsius) can cause stress build-up and polymer film microcracking in the polymer layers. These effects will increase the polymer waveguide attenuation, increase the polarization dependence of the waveguide, and require the waveguide devices to be temperature stabilized.

It has been demonstrated in U.S. patent application Ser. No. 10/045,317, filed on Nov. 7, 2001, which is owned by the assignee of the present invention and which is incorporated herein by reference in its entirety, that by using polymer substrates for polymer waveguides, the CTE mismatch induced problems can be greatly alleviated. It is desirable to further eliminate the CTE mismatch induced problems to minimal level by eliminating the substrate.

BRIEF SUMMARY OF THE INVENTION

Briefly, the present invention provides an optical waveguide. The waveguide is comprised of a first cladding layer having a first exposed surface portion and a second surface portion generally opposing the first exposed surface portion, and a core disposed on a portion of the second surface portion. The core has a first end and a second end. The waveguide is also comprised of a second cladding layer having a first exposed surface portion and a second surface portion generally opposing the first exposed surface portion. The second surface portion of the second cladding layer is disposed on the core and a remaining portion of the second surface portion of the first cladding layer.

Additionally, the present invention provides a method of manufacturing a waveguide. The method comprises providing a substrate; disposing a first material onto the substrate; disposing at least a second material onto the first material; and engaging at least the first material with a solvent, the solvent dissolving the first material and separating the at least second material from the substrate.

Further, the present invention also provides an optical waveguide assembly. The assembly is comprised of an optical waveguide including a first cladding layer having a first exposed surface portion and a second surface portion generally opposing the first exposed surface portion, and a core disposed on a portion of the second surface portion. The core has a first end and a second end. The waveguide also includes a second cladding layer having a first exposed surface portion and a second surface portion generally opposing the first exposed surface portion. The second surface portion of the second cladding layer is disposed on the core and a remaining portion of the second surface portion of the first cladding layer. The assembly is also comprised of a first support structure disposed on at least one of the first cladding layer and the second cladding layer, proximate the first end of the core and a second support structure disposed on at least one of the first cladding layer and the second cladding layer, proximate the second end of the core. The assembly is further comprised of a support surface engaging each of the first and second support structures.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIGS. 1A through 1F illustrate, in perspective view, a build-up of layers making up an optical waveguide according to the present invention.

FIG. 6 shows, in perspective view, the optical waveguide according to the present invention after the support structures have been attached to a support surface.

DETAILED DESCRIPTION OF THE INVENTION

Figure 1D:
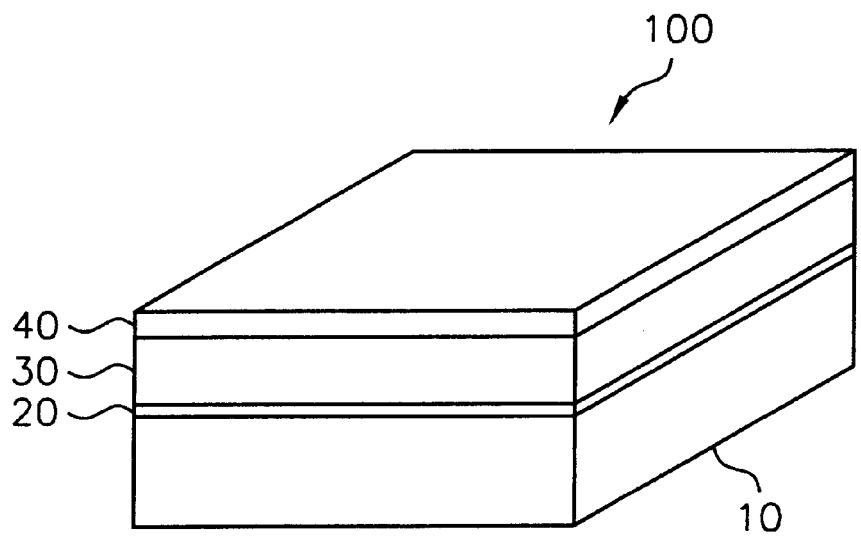

In the drawings, like numerals indicate like elements throughout. Referring to FIGS. 1A through 1F and 2A through 2E, a freestanding optical waveguide 100 and a method of manufacturing the waveguide 100 are disclosed. The waveguide 100 is comprised of a lower cladding layer 30, a core layer 40 disposed on at least a portion of the cladding layer 30, and an upper cladding layer 70 disposed on the core layer 40 and a remaining portion of the lower cladding layer 30.

Referring to FIG. 1A, a substrate 10 is selected as a base on which to form the waveguide. Preferably, the substrate 10 is a polymer, including thermoplastic polymers, such as polycarbonate, acrylic (polymethyl methacrylate), cellulosic, thermoplastic elastomer, ethylene butyl acrylate, ethylene vinyl alcohol, ethylene tetrafluoroethylene, FEP (fluorinated ethylene propylene), PFA (polyperfluoroalkoxyethylene), nylon, polybenzimidazole, polyphenylene sulfide, liquid crystalline polymers (for example, VECTRA®), polyester, polyethylene, polyimide, polystyrene, polysulfone, PVD (polyvinyl chloride), PVDF (polyvinylidene fluoride), ABS polymers (polyacrylonitrile butadiene styrene), acetal copolymer, TEFLON® AF, CYTOP®, HYFLON®, and any other thermoplastic polymers; and thermoset polymers, such as DAP (diallyl phthalate), epoxy, furan, phenolic, thermoset polyester, polyurethane, vinyl ester, perfluorocyclobate, and any other thermoset polymers. Substrates 10 made from the above listed polymers and combinations of the above listed polymers and any other polymers exhibit similar CTE to perflourinated polymer waveguide materials. Although a polymer is the preferred material for the substrate 10, those skilled in the art will recognize that other materials, including, but not limited to, silicon based substrates can be used. Although the substrate 10 depicted in FIGS. 1A through 1F and 2A through 2E is generally rectangular, those skilled in the art will recognize that other shapes, such as generally circular, can be used.

As seen in FIG. 1B, a first material comprising a buffer 20 is disposed over a top surface of the substrate 10. Preferably, the buffer 20 is a metal, and more preferably, gold, although those skilled in the art will recognize that other materials can be used. The buffer 20 is preferably deposited by vapor deposition, although those skilled in the art will recognize that other methods can be used. Preferably, the buffer 20 is only approximately 0.1 to 0.5 microns thick, so that subsequent annealing of the waveguide 100 will not induce cracking due to thermal fluctuations.

As seen in FIG. 1C, a second material comprising the first cladding layer 30 is disposed on the buffer 20. Preferably, the first cladding layer 30 is a polymer, and, more preferably, a perfluoropolymer. The first cladding layer 30 is preferably deposited onto the buffer 20 by dissolving the polymer in a suitable solvent, spincoating the solution onto the buffer 20, and evaporating the solvent, leaving only the polymer, in a layer approximately 1 to 5 microns thick. Preferably, the first cladding layer 30 is deposited in a series of sub-layers (not shown) until the first cladding layer 30 is approximately 10 to 30 microns thick. As polymer dissolution and spincoating are well known in the art, a detailed description of the process will not be described herein.

As seen in FIG. 1D, the core layer 40 is disposed on the first cladding layer 30. Preferably, the core 40 is a polymer, and, more preferably, a perfluoropolymer. Preferred perfluoropolymers are disclosed in U.S. patent applications, Ser. No. 09/507,582, filed Feb. 18, 2000 and Ser. Nos. 09/722,821 and 09/722,282, both filed on Nov. 28, 2000, which are all owned by the assignee of the present invention and are incorporated herein by reference in their entireties. Preferably, the core layer 40 is disposed on the first cladding layer 30 by spincoating in a manner as described above. Preferably, only one coating of the core layer 40 is required, although those skilled in the art will recognize that the core layer 40 may be deposited in multiple sub-layers.

Figure 1E:
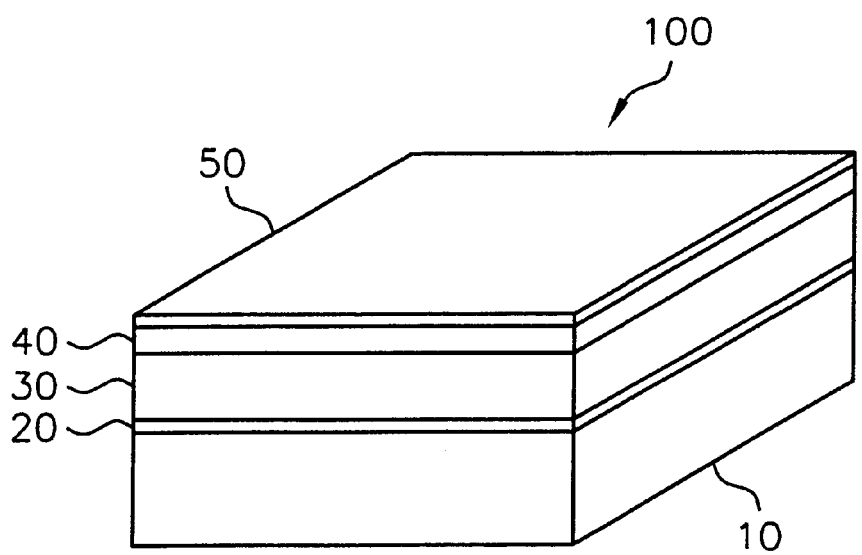
Figure 1E:
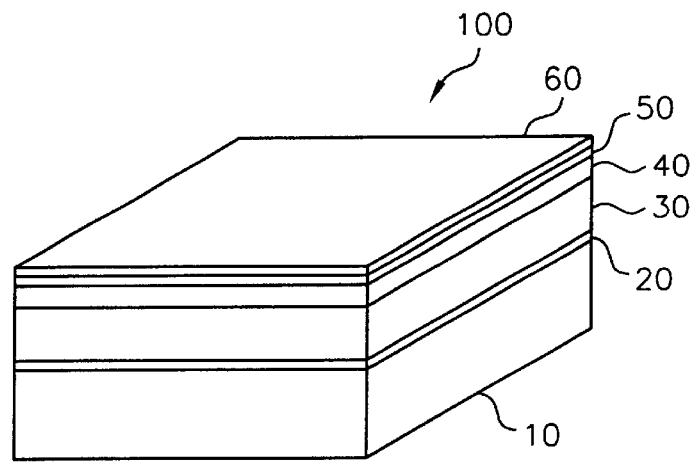

As seen in FIG. 1E, a mask layer 50 is disposed on the core layer 40. Preferably, the mask layer 50 is aluminum, which is deposited by vapor deposition, although those skilled in the art will recognize that other materials besides aluminum and other methods besides vapor deposition can be used to deposit the mask layer 50 onto the core layer 40.

As seen in FIG. 1F, a photoresist layer 60 is disposed on the mask layer 50. Preferably, the photoresist layer 60 is spincoated onto the mask layer 50 by known methods and the waveguide 100 is heated to cure the photoresist layer 60. A mask (not shown) is applied to the photoresist layer 60 and exposed to ultraviolet light to transfer the mask shape to the photoresist layer 60.

Figure 2A:
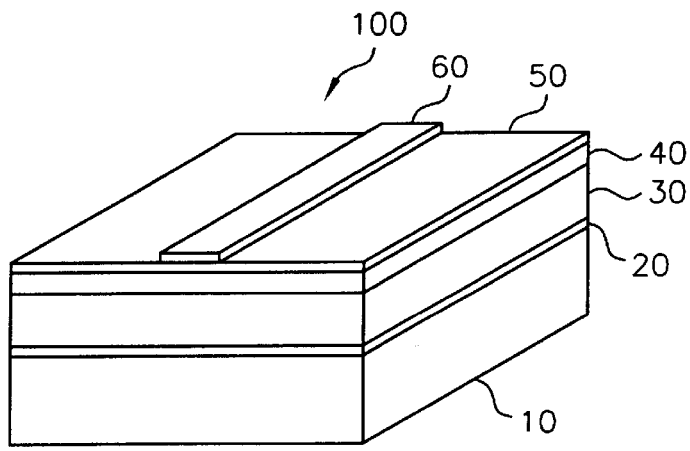
FIGS. 2A through 2E illustrate, in perspective view, the etching process to form a waveguide core channel in the waveguide according to the present invention.

As shown in FIG. 2A, the photoresist layer 60 is stripped to reflect the mask shape. The mask shape shown in FIG. 2A is a generally straight line channel, although those skilled in the art will recognize that other shapes can be used, such as the curved waveguide shape disclosed in U.S. patent application Ser. No. 09/877,871, filed Jun. 8, 2001, which is owned by the assignee of the present invention and is incorporated herein by reference in its entirety.

Figure 2B:
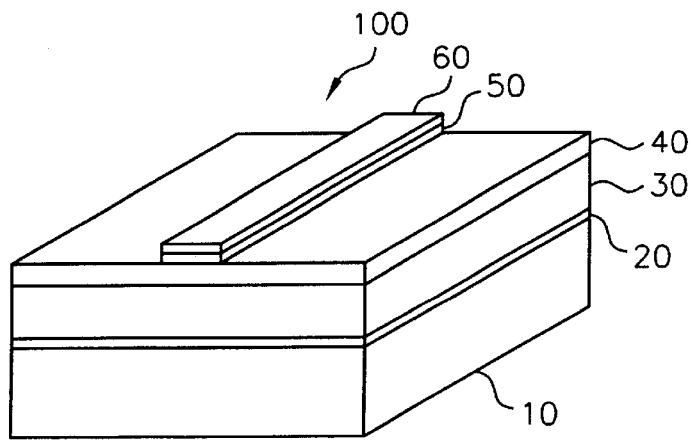
Figure 2C:
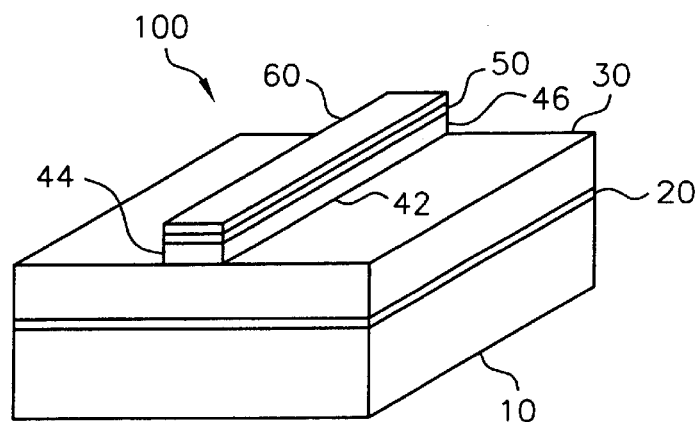

As shown in FIG. 2B, the remaining photo-resist 60 serves as a mask for etching the mask layer 50. Preferably, the etching is performed with an acid solution, which is well known to those skilled in the art, so as not to inadvertently etch the buffer 20. As shown in FIG. 2C, the etched mask layer 50 serves as a mask for reactive ion etching of the core layer 40, forming a core channel 42, having an input end 44 and an output end 46.

Figure 2D:
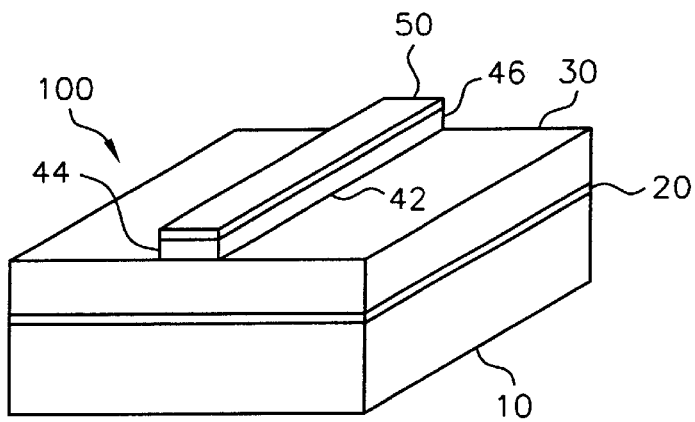
Figure 2E:
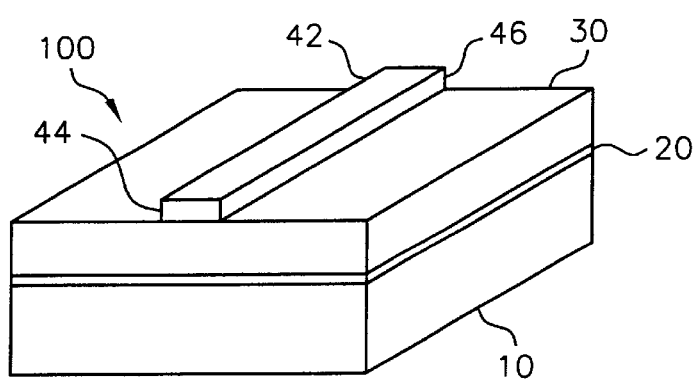
Figure 3:
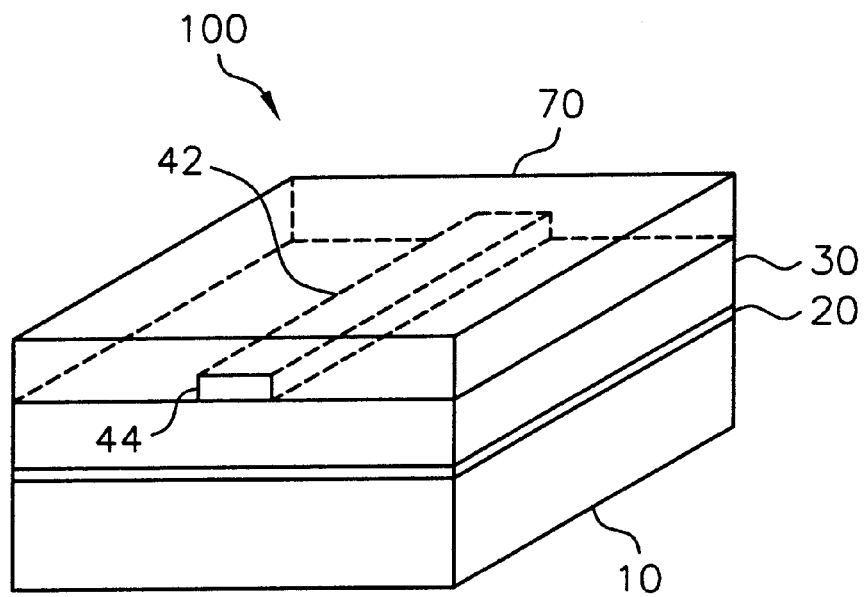
FIG. 3 shows, in perspective view, the optical waveguide according to the present invention after the upper cladding layer has been deposited.

Referring to FIGS. 2D and 2E, the remaining mask layer 50 and the photoresist 60 are removed by corresponding solvents, leaving the exposed core channel 42 on top of the lower cladding layer 30. As shown in FIG. 3, the upper cladding layer 70 is next disposed on the core channel 42 and the portion of the lower cladding layer 30 not covered by the core channel 42. The upper cladding layer 70 is preferably deposited in the same manner as the lower cladding layer 30, as described above, and can be comprised of a plurality of sub-layers disposed on top of each other.

Figure 4:
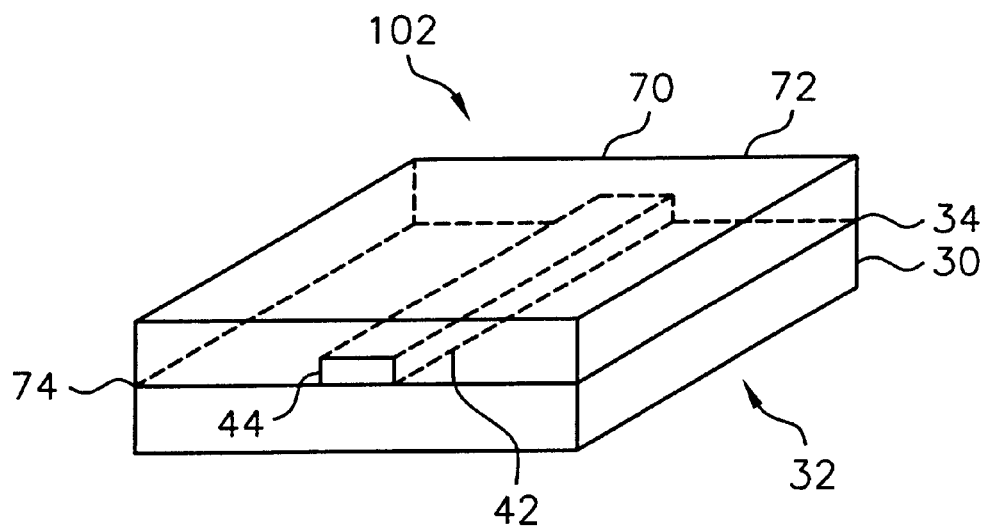
FIG. 4 shows, in perspective view, the optical waveguide according to the present invention after the buffer layer has been dissolved and substrate has been stripped away.

Next, the waveguide 100 is immersed in a gold etching solution to dissolve the buffer 20 away, therefore separating the polymer waveguide film 102, comprised of the lower cladding layer 30, the core channel 42, and the upper cladding layer 70, from the substrate 10, forming a free standing waveguide film 102, as shown in FIG. 4. The lower cladding layer 30 has a bottom, or exposed surface portion 32 and a top, surface portion 34, generally opposing the exposed surface portion 32, on at least a portion of which the core channel 42 is disposed. The top cladding layer 70 has a top, or exposed surface portion 72 and a bottom surface portion 74, generally opposing the exposed surface portion 72, the bottom surface portion 74 being disposed on the core channel 42 and a remaining portion of the top surface portion 34 of the first cladding layer 30.

Although gold is preferred for the buffer 20, those skilled in the art will recognize that the buffer 20 can be a material that is soluble in a selected solvent that dissolves only the buffer 20 and not the cladding layers 30, 70 or the core 40.

Figure 5:
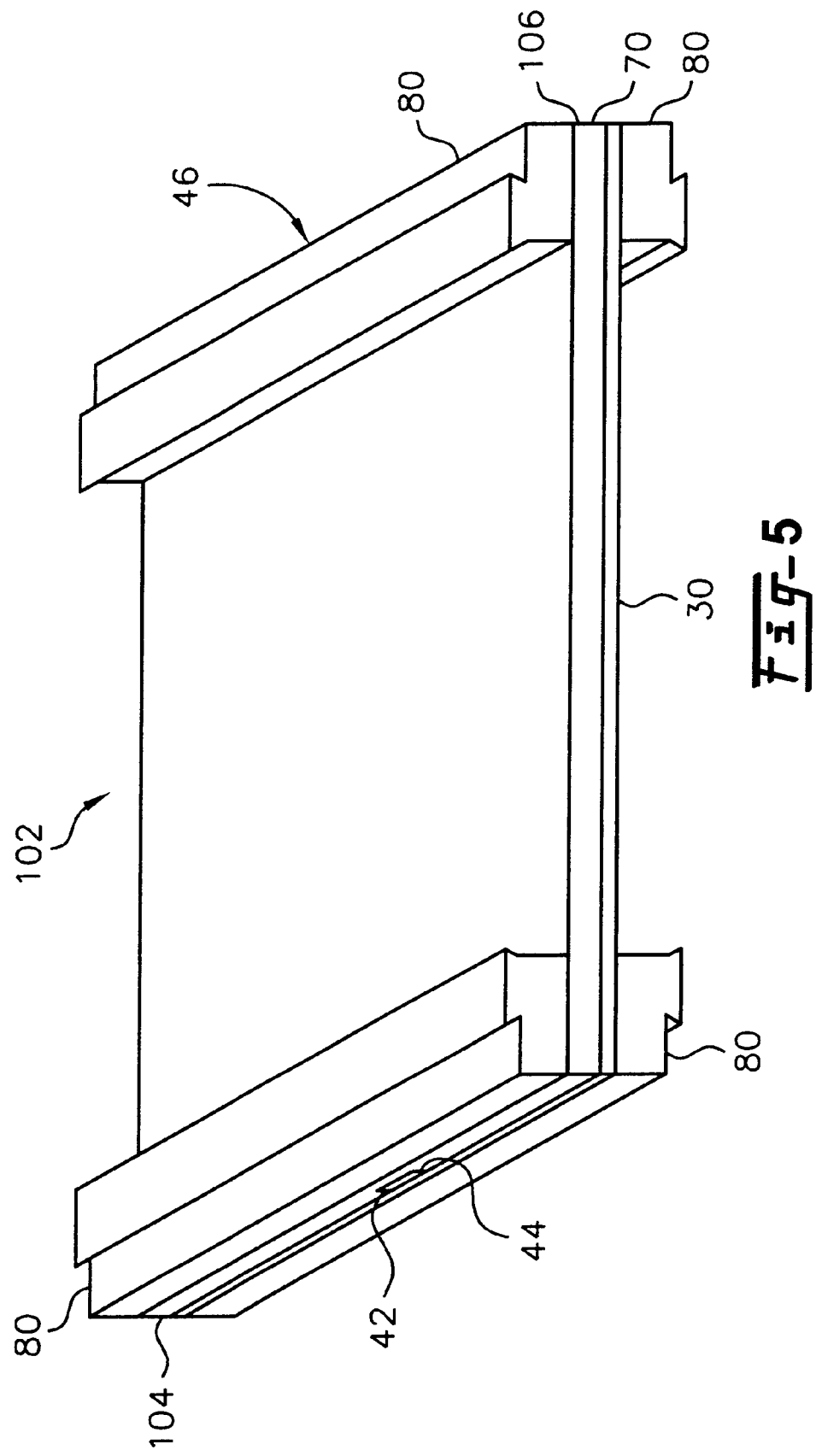
FIG. 5 shows, in perspective view, the optical waveguide according to the present invention after support structures have been attached to the waveguide.

After removing the substrate 10 from the rest of the waveguide film 102, support structures 80 are fixedly connected to the waveguide film 102 as is shown in FIG. 5. A support structure 80 is connected to the waveguide film 102 proximate to the input end 44 of the core channel 42 on each the lower cladding layer 30 and the upper cladding layer 70, as well as proximate the output end 46 of the core channel 42 on each of the lower cladding layer 30 and the upper cladding layer 70. The support structures 80 are preferably thin strips of polymer material and are adhered to the waveguide film 102 by an adhesive, such as epoxy. The support structures 80 serve as a supporting structure for subsequent dicing/polishing so that a smooth endface 104, 106 of the waveguide film 102 is formed for coupling light signals in and out of the waveguide film 102.

Alternatively, the support structures 80 can be fixedly connected to the top surface portion 72 of the upper cladding layer 70 prior to removing the substrate 10. The effect of installing these support structures 80 prior to removing the substrate 10 is to provide a solid surface with which to manipulate the waveguide film 102 after the substrate 10 is removed. The remaining support structures 80 can then be fixedly connected to the bottom surface portion 32 prior to dicing/polishing.

Referring now to FIG. 6, each polished end face 104, 106 then undergoes standard fiber attaching/pigtailing with pigtail connections 90, 92 fixedly connected to the input 44 and the output 46, respectively, of the core channel 42. Each pigtail connection 90, 92, is connected to a fiber 94, 96 which provide input and output connections for the waveguide film 102, respectively. Next, the lower support structures 80 are mechanically fixed to a support surface 98, forming a waveguide assembly 200. The waveguide assembly 200 can then be inserted into an optical amplifier or other optical device (not shown).

As shown in FIGS. 5 and 6, the waveguide film 102 is able to flex and deform, such as a result of temperature fluctuations. Since the substrate 10 has been removed, the waveguide film 102 can undergo such deformation without microcracking, providing a more reliable waveguide than one disposed on a substrate.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical waveguide comprising:
 a first cladding layer having a first exposed surface portion and a first surface portion generally opposing the first exposed surface portion;
 a core disposed on a portion of the first surface portion, the core having a first end and a second end; and
 a second cladding layer having a second exposed surface portion and a second surface portion generally opposing the second exposed surface portion, the second surface portion of the second cladding layer being disposed on the core and a remaining portion of the first surface portion of the first cladding layer.

2. The optical waveguide according to claim 1, further comprising a first support structure disposed on at least one of the first cladding layer and the second cladding layer, proximate the first end of the core.

3. The optical waveguide according to claim 2, further comprising a second support structure disposed on at least one of the first cladding layer and the second cladding layer, proximate the second end of the core.

4. The optical waveguide according to claim 1, wherein the first cladding layer is a polymer.

5. The optical waveguide according to claim 4, wherein the polymer is a perfluoropolymer.

6. The optical waveguide according to claim 1, wherein the core comprises a straight channel.

7. The optical waveguide according to claim 1, wherein the core comprises a curved channel.

8. The optical waveguide according to claim 1, wherein the first cladding layer comprises a plurality of first cladding layers.

9. The optical waveguide according to claim 1, wherein the second cladding layer comprises a plurality of second cladding layers.

10. An optical waveguide assembly comprising:
 an optical waveguide including:
  a first cladding layer having a first exposed surface portion and a first surface portion generally opposing the first exposed surface portion;
  a core disposed on a portion of the first surface portion, the core having a first end and a second end; and
  a second cladding layer having a second exposed surface portion and a second surface portion generally opposing the second exposed surface portion, the second surface portion of the second cladding layer being disposed on the core and a remaining portion of the first surface portion of the first cladding layer;
 a first support structure disposed on at least one of the first cladding layer and the second cladding layer, proximate the first end of the core;
 a second support structure disposed on at least one of the first cladding layer and the second cladding layer, proximate the second end of the core; and
 a support surface engaging each of the first and second support structures.

* * * * *